United States Patent
Gilbert et al.

(10) Patent No.: US 6,490,247 B1
(45) Date of Patent: *Dec. 3, 2002

(54) RING-ORDERED DYNAMICALLY RECONFIGURABLE NETWORK USING AN EXISTING COMMUNICATIONS SYSTEM

(75) Inventors: Timothy G. Gilbert, Vermillion, SD (US); Istvan Fekete, Dakota Dunes, SD (US); Jeffrey Schindler, Sioux City, IA (US)

(73) Assignee: Gateway, Inc, Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/670,609

(22) Filed: Jun. 26, 1996

(51) Int. Cl.⁷ .................................................. H04J 3/00
(52) U.S. Cl. ....................................... 370/222; 370/224
(58) Field of Search ................................ 370/216, 217, 370/220, 222, 223, 224, 225, 227, 228, 408, 407, 406, 405, 404, 403, 402, 522, 431, 524, 537, 465, 468, 252, 254; 395/181; 340/827, 825.01, 825.03; 379/221

(56) References Cited

U.S. PATENT DOCUMENTS

| | | | |
|---|---|---|---|
| 4,663,748 A | 5/1987 | Karbowiak et al. | 370/89 |
| 4,866,703 A | 9/1989 | Black et al. | 370/60 |
| 4,872,197 A | 10/1989 | Pemmaraju | 379/93 |
| 4,999,832 A | 3/1991 | Black | 370/85.14 |
| 5,003,531 A * | 3/1991 | Farinholt et al. | 370/223 |
| 5,041,963 A * | 8/1991 | Ebersole et al. | 370/408 |
| 5,233,607 A | 8/1993 | Barwigk et al. | 370/94.1 |
| 5,323,388 A | 6/1994 | Chang et al. | 370/60 |
| 5,365,265 A | 11/1994 | Shibata et al. | 348/15 |
| 5,412,652 A * | 5/1995 | Lu | 370/223 |
| 5,416,781 A | 5/1995 | Ruiz | 370/110.1 |
| 5,444,703 A | 8/1995 | Gagliardi et al. | 370/60.1 |
| 5,459,720 A | 10/1995 | Iliev et al. | 370/60 |
| 5,463,623 A | 10/1995 | Grimes et al. | 370/79 |
| 5,517,489 A * | 5/1996 | Ogusa | 370/223 |

FOREIGN PATENT DOCUMENTS

| | | |
|---|---|---|
| EP | 0127138 | 12/1984 |
| FR | 2590384 | 5/1987 |

OTHER PUBLICATIONS

Marsden, P., "Interworking IEEE 802/FDDI LAN's via the ISDN frame relay bearer service", *Proceedings of the IEEE*, vol. 79, No. 2, pp. 223–229, (Feb. 1991).

* cited by examiner

*Primary Examiner*—Dang Ton
(74) *Attorney, Agent, or Firm*—Scott Charles Richardson; John M. Dahl; Schwegman, Lundberg, Woessner & Kluth

(57) ABSTRACT

A ring-ordered dynamically reconfigurable computer network utilizing an existing communications system. The network comprises a plurality of nodes. Each node is coupled to the existing communications system by two data channels and a control channel. The network is established by each data channel of each node connecting operably to a data channel of another node. All the nodes are ordered in a ring. The control channel of each node is operably connected to the switch of the existing communications system. The network also comprises a network manager to establish the network, facilitate communication among the nodes, and dynamically reconfigure the network without disturbing communication among the nodes. Optionally, each node connects to the network only when it actually needs to communicate with another node.

50 Claims, 5 Drawing Sheets

RING-ORDERED DYNAMICALLY RECONFIGURABLE NETWORK USING AN EXISTING COMMUNICATIONS SYSTEM

FIELD OF THE INVENTION

The present invention relates generally to networking technology, and more particularly to a network that is ring ordered, dynamically reconfigurable, and utilizes an existing communications system.

BACKGROUND OF THE INVENTION

Networks are typically used to allow nodes, frequently computers, to communicate with one another. In this way, electronic mail, data files, and other information can be exchanged among computers. The computers may, for example, be located in a common office, or alternatively separated from each other by great distances.

Present-day networks typically utilize technologies which are hard wired and use special-purpose cables and circuitry. For example, a local-area network (LAN) connecting computers within an office may use an Ethernet topology. In this situation, a special cable must be run from the server to each computer in the network. Such a network is also generally not easily reconfigured. If a computer needs to be added or removed from the network, the entire network must first be taken down, reconfigured, and then turned back on. No dynamic reconfiguration is usually possible; a node cannot be added or removed from the network while other nodes on the network continue to communicate with one another.

Wide-area networks (WANs) that allow communication among computers separated from one another by great distances have similar weaknesses. Rather than utilizing existing telecommunications systems, such as two data channel-one control channel systems like Integrated Services Digital Network (ISDN), they tend to require special, highly sophisticated cabling and circuitry. Moreover, wide-area networks typically cannot be assimilated seamlessly with local-area networks except through other special-purpose interfaces. Wide-area networks are also usually incapable of dynamic reconfiguration.

A further deficiency with present-day local-area and wide-area networks is that each computer residing on a particular network typically remains connected to the network all the time, regardless of whether the computer is communicating with another computer or not. This means that the cabling used to connect computers into a network must be dedicated solely for the purpose of networking. The line that connects a particular computer to a server in a local-area networking environment, for example, cannot be used for any other purpose. Forced constant connection to a network also becomes expensive in the situation where a user of a computer connected to such a network is charged on a per-minute basis for the connection.

There is a need, therefore, for networking technology that utilizes general-purpose lines, such as existing telecommunications systems like ISDN, instead of special-purpose cables and circuitry. There is also a need for networking technology that allows for the dynamic reconfiguration of a network, so that computers can be added to or removed from the network without disturbing existing communication among the other computers. Finally, there is a need for networking technology that enables a computer to be connected to a network only when it actually needs to communicate with another computer, instead of having to remain constantly connected to the network, and thus potentially incurring connect-time charges.

SUMMARY OF THE INVENTION

A ring-ordered dynamically reconfigurable computer network utilizes an existing communications system. A first embodiment of the invention comprises a plurality of nodes. Each node is coupled to the existing communications system by two data channels and a control channel. The network is established by each data channel of each node connecting operably to a data channel of another node, so that all the nodes are ordered in a ring. The control channel of each node is operably connected to a switch of the existing communications system. In the first embodiment a network manager establishes the network, facilitates communication among the nodes, and dynamically reconfigures the network without disturbing communication among the nodes.

In a second embodiment of the invention each node for joining a peer-to-peer ring-ordered dynamically reconfigurable computer network of a plurality of nodes utilizing an existing communications system contains a network manager, while in a third embodiment of the invention a network adaptor is used to connect a node to such a network. Both of these embodiments also have network management capability providing the option of a node connecting to the network only when it actually needs to communicate with another node.

The present invention overcomes problems found in the prior art. The nodes in the present invention connect in a ring-ordered network by utilizing an existing communications system, not special-purpose cables. The network manager of the present invention allows for dynamic reconfiguration of the network, which enables nodes to be added to or removed from the network without having to first take the entire network down. The network managers also provides for the advantage of allowing a node to connect to the network only when it actually needs to communicate with another node. Other and further aspects and advantages of the present invention will become apparent in the following description and by reference to the accompanying drawings.

DETAILED DESCRIPTION

Figure 1:
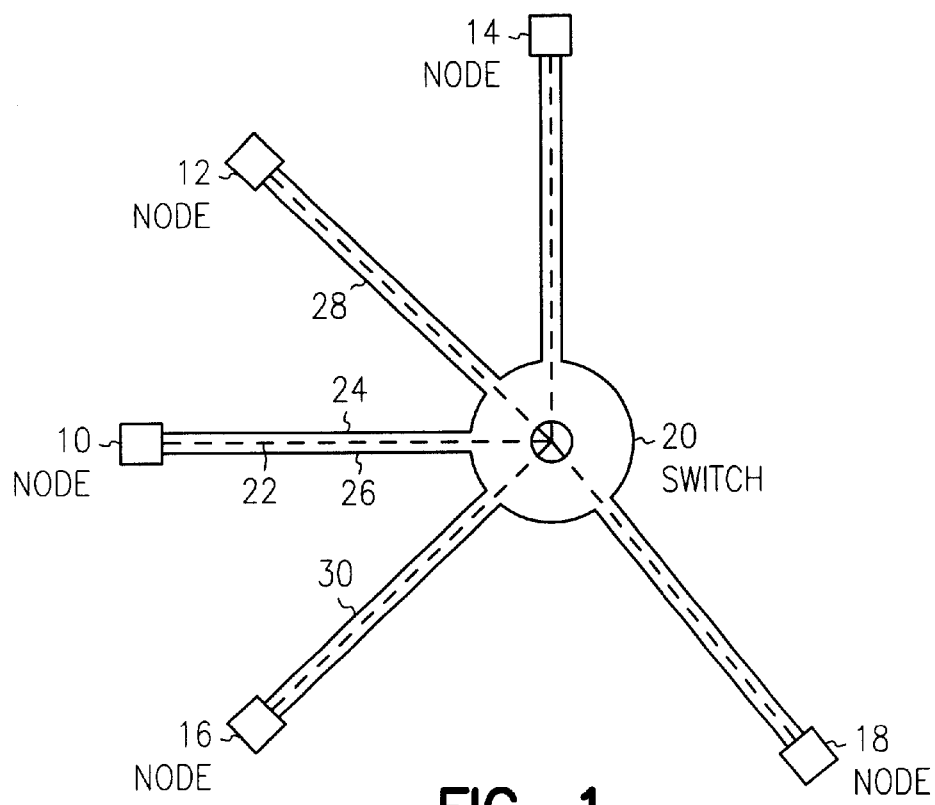
FIG. 1 is a diagram of the basic topology of a ring-ordered dynamically reconfigurable network utilizing an existing communications system, according to the present invention.

Referring to FIG. 1, the basic topology of a ring-ordered dynamically reconfigurable computer network utilizing an existing communications system according to the present invention is shown. Nodes 10, 12, 14, 16 and 18 are operatively coupled to switch 20. Switch 20 is part of the existing communications system, which in one particular embodiment is ISDN. However, any existing communications system capable of implementing two data channels and one control channel can be used, whether such arrangement is logical or physical. For example, although an ISDN line is usually a twisted-pair cable consisting of two wires, there are generally two logical data channels and a logical control channel transmitted over these two physical wires. For further example, an embodiment of an ISDN line having six B channels and one D channels can also be used. Each node is operatively coupled to the switch via a control channel of the existing communications system. For example, control channel 22 of node 10, indicated by a broken line, is coupled to switch 20.

Each node is also operatively coupled to two other nodes. As shown in FIG. 1, node 10 is coupled to nodes 12 and 16; node 12 is coupled to nodes 10 and 14; node 14 is coupled to nodes 12 and 18; node 16 is coupled to nodes 10 and 18; and, node 18 is coupled to nodes 16 and 14. Each node is operatively coupled to two other nodes via data channels of the existing communications system, through the switch. For example, data channel 24 of node 10 is operatively coupled to data channel 28 of node 12 at switch 20, and data channel 26 of node 10 is operatively coupled to data channel 30 of node 16 at switch 20. In this way, the nodes are ordered in a ring. As those skilled in the art will readily understand, the number of nodes of a network contemplated by the invention can be either greater or less than the number shown in FIG. 1.

Figure 2:
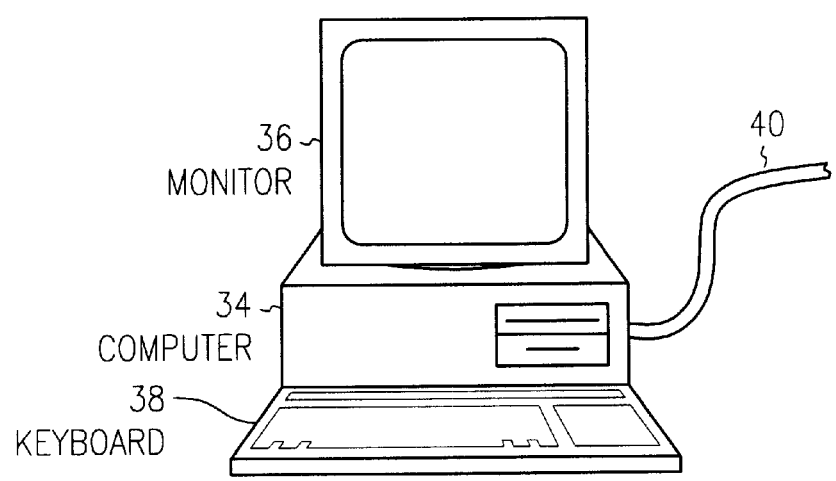
FIG. 2 is diagram of a typical computer networked according to the present invention.

Nodes 10, 12, 14, 16 and 18 of FIG. 1 are typically computers having networking capability. However, the nodes can also be printers, or other devices, and the invention is not limited to nodes being computers. Referring now to FIG. 2, an example of a computer is shown. Computer 34 has connected to it monitor 36 and keyboard 38. Not shown is that computer 34 typically has a read-only memory (ROM), a random-access memory (RAM), a central processing unit (CPU), and a storage device such as a hard and/or floppy disk drive. Line 40 is also connected to computer 34, and comprises the data channels and control channel referred to in FIG. 1 (for example, data channels 22 and 24 and control channel 26 of node 10).

As those skilled in the art understand, the data channels and control channel are typically connected to the computer via ports on the computer. Such ports typically are RJ-45 or RJ-11 connectors that accept a twisted-pair cable carrying two ISDN logical B channels and one ISDN logical D channel. In one embodiment of the present invention, each node of the network is a computer as shown in FIG. 2. A network manager functions to establish the network, facilitate communication among the nodes, and to dynamically reconfigure the network without disturbing communication among the nodes. In one embodiment of the invention, the network manager is contained within each node such that the nodes communicate in a peer-to-peer manner. In a further embodiment, a port controller runs on each computer to perform the network manager function. In yet a further embodiment, a single node is selected as a master node and must always be coupled to the network to perform the network manager functions.

Figure 3:
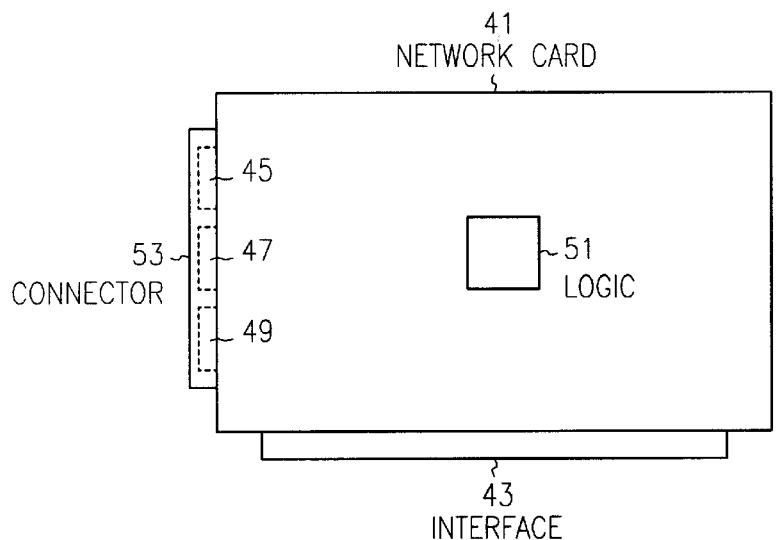
FIG. 3 is a diagram of a typical network card to allow a computer to be networked according to the present invention.

In another embodiment of the present invention, a network card couples each line to each computer (for example, line 40 to computer 34). Examples of such network cards that may be modified according to the present invention include the IBM WaveRunner, and the SecureLink II. Referring now to FIG. 3, a block diagram of such a network card is shown. Network card 41 has interface 43 for coupling to a computer, and has logical data connections 45 and 47 and logical control connections 49 for coupling to two data channel and a control channel, respectively, of an existing communication system. As those skilled in the art know, however, these logical connections frequently will make up a single port, for example, connector 53. Interface 43 in one embodiment is a connector for connection to a PCI bus, as those skilled in the art recognize as a common interface by which expansion cards are connected to a computer; however, the invention is not so limited. Network card 41 also contains data processing logic 51. The port controller runs on each network card, via logic 51, to perform the network manager function.

Figure 4:
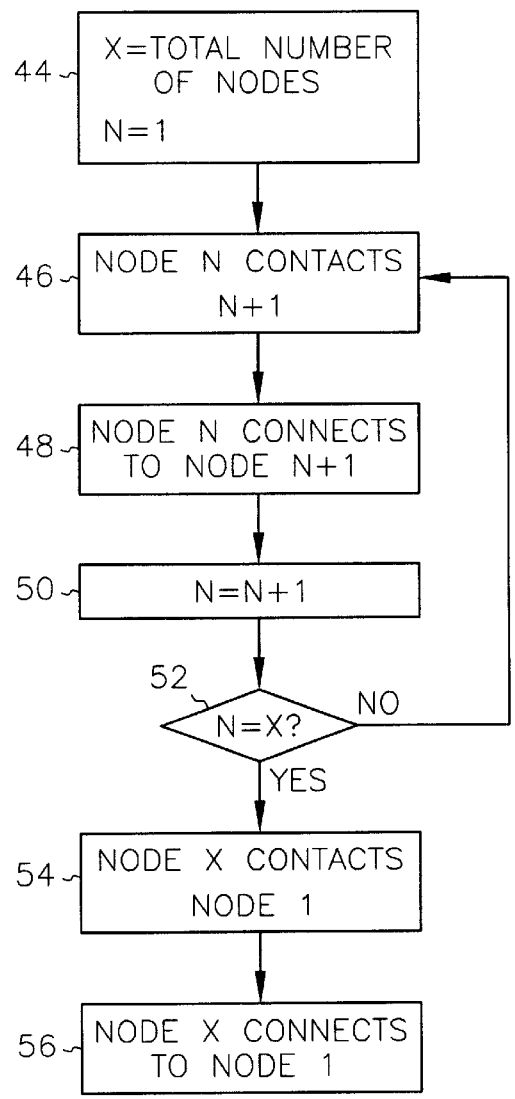
FIG. 4 is a flowchart showing the preferred method to establish a network according to the present invention.

Referring now to FIG. 4, a flowchart outlining the preferred method to establish a network according to the present invention is shown. The steps of the flowchart are executed by the network manager. The invention contemplates a list of nodes that are to be networked. As those skilled in the art can readily appreciate, this list of nodes can be created in a number of ways, and the invention is not limited to any one particular manner. For example, the list of nodes can be predetermined such that each node has the list prior to the establishment of the network. Alternatively, the list of nodes can be completely specified by the node which is initiating the network, and passed on to other nodes as they are connected to the network. The list itself must contain enough identifying information regarding each node so that the node can be contacted through the existing communications system, and distinguished from the other nodes. By way of example only, and not meant to limit the present invention, if the existing communications system is ISDN, then the list would preferably contain what is known as the directory number of each data channel at each node, as well as the name of the node. Each node, therefore, has two directory numbers associated with it, one for each data channel. The name of a particular node commonly corresponds to the name of the user of that node.

Still referring to FIG. 4, in step 44, the variable X is set to the total number of nodes on the list of nodes that are to be networked, while the variable N is a counter which is initially set to 1 to indicate the first node. In this way, the nomenclature "node X" refers to the last node to be networked, while "node N" refers to the Nth node. In step 46, node N contacts node N+1 to alert node N+1 that it wishes to connect with node N+1. This is accomplished by node N sending a message from its control channel to the switch. The message contains node N's directory numbers, or other unique address information for that node within the existing communications systems, the directory numbers or other unique address information of node N+1, and a command to the switch that node N wishes to connect with node N+1. Next, in step 48, node N connects to node N+1. This is accomplished by a data connection of node N connecting to a data channel of node N+1 within the switch. That is, the switch causes a connection to be made between node N and node N+1, assuming that node N+1 is available (i.e., not communicating with another node). In step 50, the counter is advanced to the next node, that is, the variable N is increased by one. If in step 52 the variable N is not equal to the variable X, then control is returned to step 46, and the entire process is repeated. Thus, node 1 contacts and then connects to node 2, node 2 contacts and then connects to node 3, etc.

Once the counter has counted to the total number of nodes that are to be networked in step 52, that is, the variable N is equal to the variable X, then the last node contacts the first node in step 54 and the last node connects to the first node in step 56. The last node contacts the first node in step 54 in the same manner in which node N contacts node N+1 in step 46, while the last node connects to the first node in the same manner in which node N connects to node N+1 in step 48. Thus, if three nodes are to be connected into a network, after node 1 contacts and connects to node 2 and node 2 contacts and connects to node 3, node 3 contacts and connects to node 1, completing the network.

As those skilled in the art will readily appreciate, many adaptations can be made to the manner in which the network is established under the present invention, without departing from its scope. For example, in an alternative embodiment of the present invention, the network is established bi-directionally. A first node would simultaneously contact two other nodes that are to be networked. Each of these nodes would then contact another node, which would also contact another node, this process continuing until all the nodes are connected to the network. For example, if there were four nodes to be networked, the nodes being numbered one through four, node one would connect with nodes two and three. Each of nodes two and three would then connect with node four, completely establishing the network. This alternative embodiment has the advantage that the network will be established twice as quickly than if the process shown in FIG. 4 is followed to establish the network.

In yet another embodiment of the present invention, the invention allows for a node refusing entry into the network. For example, in step 46 of FIG. 4 node N contacts node N+1. However, node N+1 may respond to node N that it does not wish to enter the network. Alternatively, node N+1 may be "busy" in that it does not have open data channels with which to connect to the network. In such case, node N contacts and then connects with node N+2 as already discussed in conjunction with steps 46 and 48 of FIG. 4, and the remainder of the network is established as has already been discussed.

Figure 5:
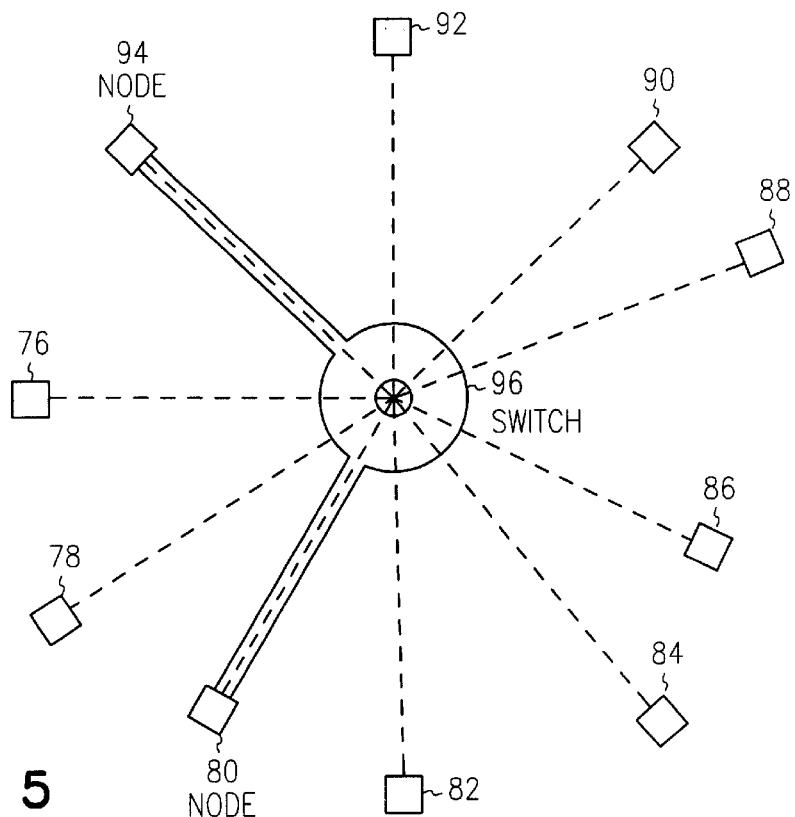
FIG. 5 is a diagram of a network according to an alternative embodiment of the invention, in which only the nodes that are actually communicating with another node are connected to the network.

Referring now to FIG. 5, a network according to an alternative embodiment of the present invention is shown. In the embodiment shown in FIG. 5, only the nodes that are actually communicating with another node are connected to the network, in accordance with FIG. 4. This alternative embodiment of the invention presents many advantages over existing network technology. For example, a particular node may not communicate frequently with other nodes. Under the present invention, this node would not have to remain connected to the network at all times. Any connect-time charges that this node might incur will, therefore, be substantially less than if the node had to remain connected to the network constantly. In the situation shown in FIG. 5, only nodes 80 and 94 are communicating with another. Therefore, nodes 80 and 94 are the only nodes operatively coupled to one another, as well as to switch 96. Nodes 76, 78, 82, 84, 86, 88, 90, and 92 potentially could also join the network if they needed to communicate with another node, but as shown in FIG. 5, they do not, and therefore are not shown as having joined the network.

Figure 6:
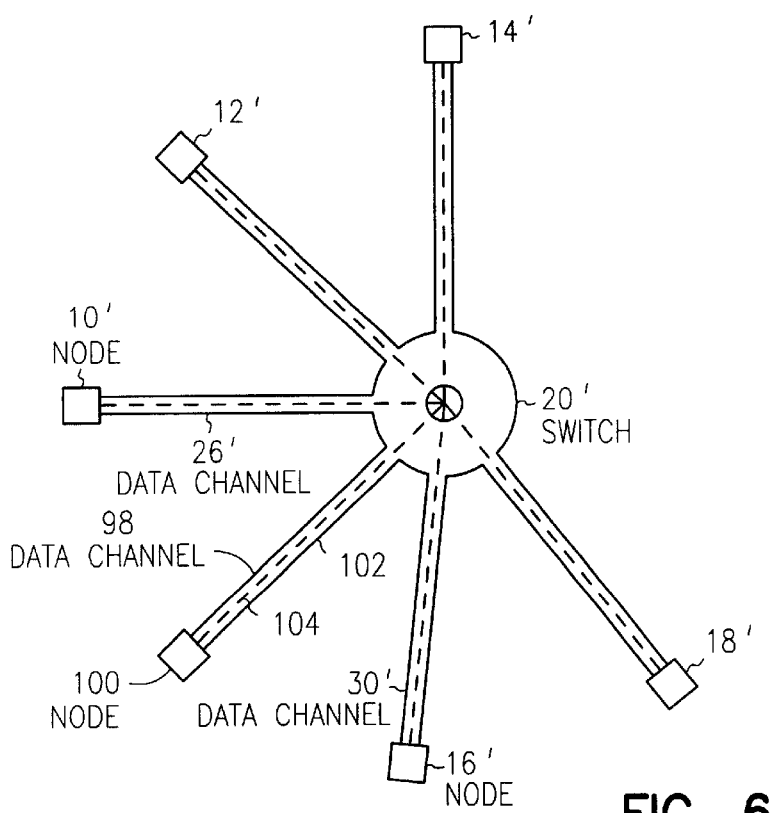
FIG. 6 is a diagram of a network in which an additional node has to been added to the network, according to the present invention.

Referring now to FIG. 6, the dynamic addition of a node to a network according to the present invention is shown.

The addition of a node is dynamic in that network communication is not disturbed while a node is being added to the network. The present invention contemplates the addition of a node to the network in two situations, although the invention is not so limited. First, a node is added to the network if it is not part of the original list of nodes to be networked, but wishes to join the network. Second, a node is added to the network when it needs to communicate with other nodes on the network, under the alternative embodiment of the present invention where nodes are only connected to the network when they need to communicate with other nodes. In this second situation, either the node initiating communication with another node, the node receiving the communication, or both, may have to be added to the network. Comparing FIG. 6 to FIG. 1, the same network is shown, with nodes 10', 12', 14', 16' and 18' of FIG. 6 corresponding to nodes 10, 12, 14, 16 and 18 of FIG. 1, and switch 20' OF FIG. 6 corresponding to switch 20 of FIG. 1. The difference is that while in FIG. 1 data channel 26 of node 10 connects to data channel 30 of node 16, in FIG. 6 data channel 26' of node 10' connects to data channel 98 of additional node 100, and data channel 30' of node 16' connects to data channel 102 of additional node 100. In addition, control channel 104 of additional node 100 connects to switch 20'.

Figure 7:
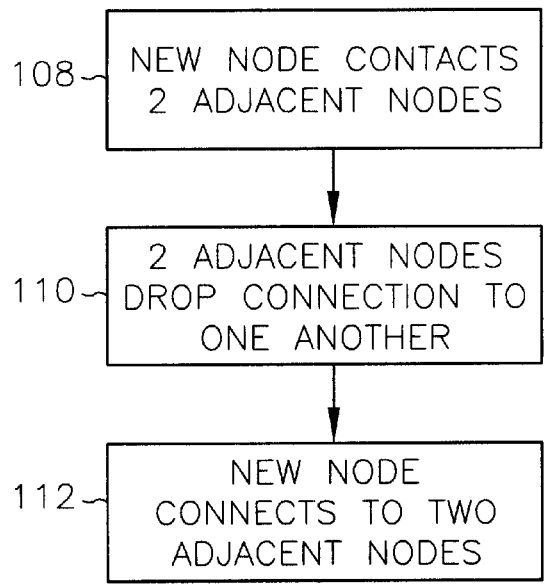
FIG. 7 is a flowchart showing the preferred method to add another node to the network according to the present invention.

Referring now to FIG. 7, a flowchart outlining the preferred method to dynamically add another node to a network according the present invention is shown. The steps of this flowchart are executed by a joinder module within the network manager. In step 108, an additional node contacts two adjacent nodes in the network, in a similar manner as node N contacts node N+1 in step 46 of FIG. 4. However, the difference is that the additional node first contacts a node it knows to be already connected on the network. In one embodiment, the present invention contemplates the additional node having the list of nodes to be networked, although the invention is not so limited. The actual node that is contacted by the additional node does not matter under the present invention. In one embodiment, the first node on the list is contacted. The node contacted by the additional node provides information regarding an adjacent node to the additional node. An example of such an additional node is additional node 100 in FIG. 6, while an example of two adjacent nodes in the network is nodes 10 and 16 in FIG. 1. Thus, additional node 100 would contact node 10, and node 10 would provide additional node 100 information regarding node 16. The information provided would preferably be the directory numbers of the adjacent node, as well as the adjacent node's name.

The node already on the network that is to be contacted by a node wishing to enter the network is alternatively determined under other schemes. For example, under one embodiment there is a primary node on the network that receives all incoming calls from other nodes wishing to enter the network. The point of entry in the network for these other nodes is then between the primary node and an adjacent node to the primary node. Alternatively, the primary node identifies another node on the network for the node wishing to enter the network to contact. Alternatively still, the node wishing to enter the network contacts the node on the network to which it is closest. In yet another embodiment, the node wishing to enter the network contacts the node on the network to which calling charges over the existing communications system is least expensive. Other schemes of the present invention include selecting the node on the network to be contacted by a node wishing to enter the network based on speed or security concerns. For example, under one embodiment there is a gatekeeper node on the network that receives all incoming calls from other nodes wishing to enter the network, but does not allow certain nodes that are on a restricted list to enter the network, or only allows certain nodes that are on an authorized list to enter the network.

Still referring to FIG. 7, in step 110, the two adjacent nodes drop connection to one another. That is, the data channel of one of the nodes no longer connects to a data channel of the other. An example of two adjacent nodes dropping connection to one another would be for data channel 26 of node 10 to disconnect from data channel 30 of node 16 in FIG. 1. Finally, in step 112, the additional node connects with each of the adjacent nodes, in the same manner as node N connects to node N+1 in step 48 of FIG. 4. For example, data channel 98 of additional node 100 connects with data channel 26' of node 10' and data channel 102 of additional node 100 connects with data channel 30' of node 16' in FIG. 6. The connections by may initiated by any one of each adjacent node pair. Once a node has been added to the network, each node receives a message by the network manager that the node has joined the network, so that, for example, the list of nodes possessed by each node in one embodiment of the invention can be updated.

Figure 8:
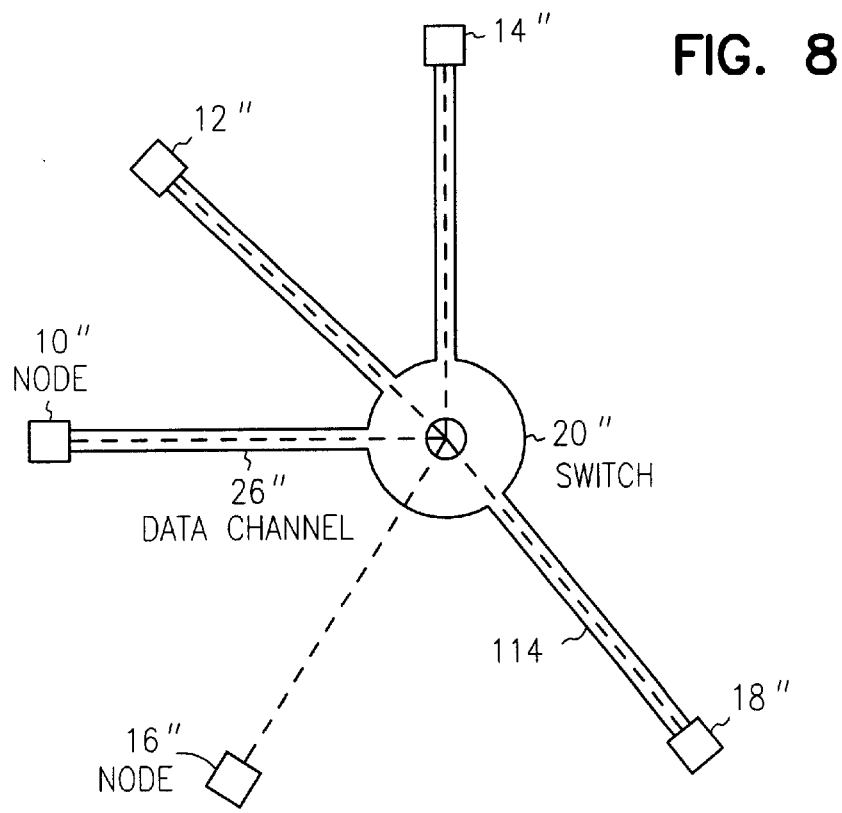
FIG. 8 is a diagram of a network in which a node has been removed from the network, according to the present invention.

Referring now to FIG. 8, the dynamic removal of a node previously connected to a network according to the present invention is shown. Similar to the addition of a node, the removal of a node is dynamic in that removal of a node does not disturb communication over the network. The present invention contemplates the removal of a node from the network in two situations, although the invention is not so limited. First, a node is removed from the network if it wishes to leave the network. Second, a node is removed from the network if it is currently not communicating with other nodes on the network, under the alternative embodiment of the present invention where nodes are only connected to the network they need to communicate with other nodes. Comparing FIG. 8 to FIG. 1, the same network is shown, with nodes 10", 12", 14", 16" and 18" of FIG. 8 corresponding to nodes 10, 12, 14, 16 and 18 of FIG. 1, and switch 20" of FIG. 8 corresponding to switch 20 of FIG. 1. The difference is that while in FIG. 1 data channel 26 of node 10 connects to data channel 30 of node 16, in FIG. 8 data channel 26" of node 10" connects to data channel 114 of node 18". In other words, node 16 in FIG. 1 has been removed from the network in FIG. 8; its control channel is no longer connected to the switch, and the two other nodes it had been connected to via data channels (nodes 10 and 18) are now connected to one another in FIG. 8.

Figure 9:
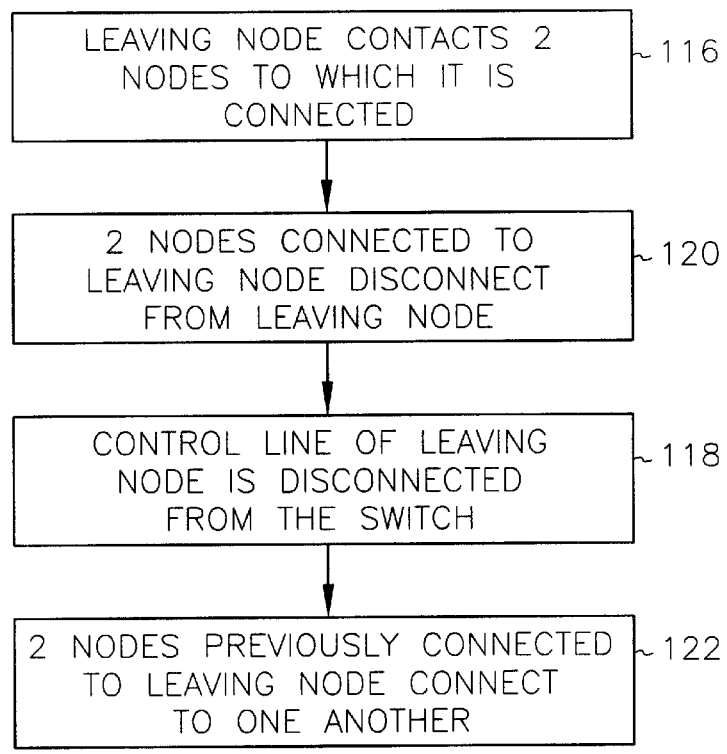
FIG. 9 is a flowchart showing the preferred method to remove a node from the network according to the present invention; and, FIG. 10 is a diagram of the logical data flow within a network according to the present invention.

Referring now to FIG. 9, a flow chart of the preferred method to dynamically remove a node from a network according to the present invention is shown. The steps of the flow chart are executed by a removal module of the network manager. In step 116, a node on the network contacts the two nodes to which its data channels connect to notify them that it is leaving the network. In one embodiment of the invention this contact is facilitated through the data channels; however, the invention is not so limited in scope, and this contact could potentially also be facilitated through the control channel. For example, if node 16 of FIG. 1 were leaving the network, it would contact both node 10 and node 18.

In step 120, the two nodes to which the leaving node is connected disconnect from the leaving node. For example, in FIG. 1 node 10 would disconnect its data channel 26 from data channel 30 of node 16, and node 18 would disconnect its data channel from the other data channel of node 16. In step 118, the control channel of the leaving node is disconnected from the switch. For example, the control channel of node 16 of FIG. 1 would be disconnected from switch 20. Finally, in step 122, the now-open data channels of the two nodes that were previously connected to the leaving node are connected to one another. For example, upon the removal of node 16 in FIG. 1, the network appears as it does in FIG. 8, with data channel 26" of node 10" connected to data channel 114 of node 18", and node 16" completely disconnected from the network. The manner in which the two nodes are connected is similar to the manner in which node N connects to node N+1 in step 48 of FIG. 4. Once a node has been removed from the network, the network manager can transmit to each node still on the network a confirmation message that the node has left the network, so that, for example, the list of nodes possessed by each node in a particular embodiment of the invention can be updated.

Figure 10:
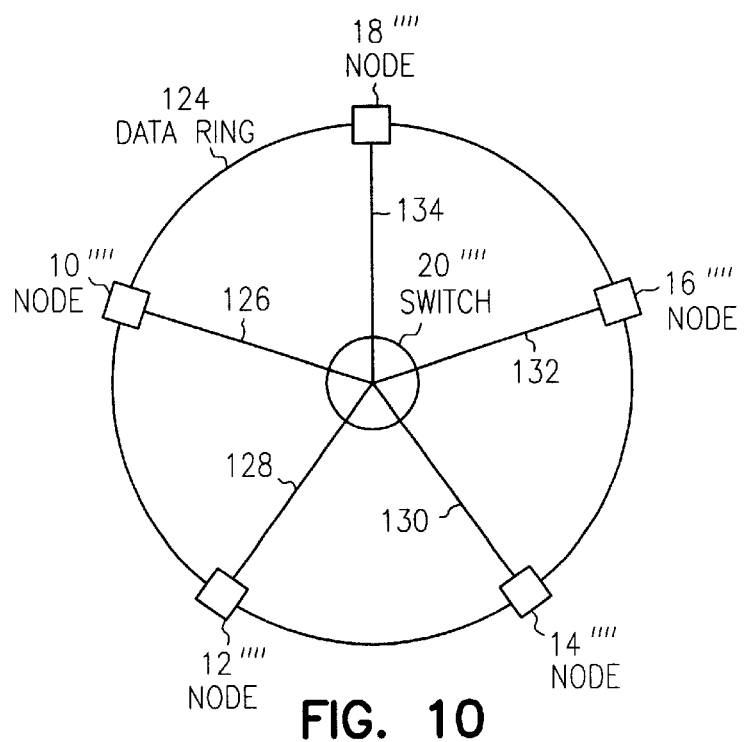

Referring now to FIG. 10, a diagram of the logical data flow of a network according to the present invention is shown. The logical data flow in FIG. 10 corresponds to the network shown in FIG. 1. Nodes 10"", 12"", 14"", 16"", and 18"" of FIG. 10 correspond to nodes 10, 12, 14, 16 and 18 of FIG. 1, and switch 20"" of FIG. 10 corresponds to switch 20 of FIG. 1. As connected in FIG. 1, the data channels of the nodes make for a ring-ordered logical data flow, which is shown as data ring 124 in FIG. 9. Not shown is that data ring 124 is bi-directional in one embodiment. Furthermore, as connected in FIG. 1, the control channels of the nodes make for a star-ordered logical control flow, the control star having its hub at switch 20"" and legs 126, 128, 130, 132 and 134 in FIG. 10.

As those skilled in the art will readily appreciate, because the logical data flow is organized in a ring topology, what is known in the art as a token protocol can be used to manage communications among the nodes. In a token protocol, a token is passed around nodes 10"", 12"", 14"" and 16"" via legs 126, 134, 132, 130, and 128, respectively. When the token reaches a particular node, that node is then given permission to communicate with other nodes. As those in the art will readily understand, this node may first have to wait for the other nodes to be connected to the network prior to communicating, under the embodiment of the invention where a node only is connected to the network when it is communicating with other nodes. Although the invention is not so limited, when the token is at a particular node, the network manager can limit the node to using only a portion of the bandwidth of the data ring. In an embodiment of the invention based on ISDN, the bandwidth of the data ring is usually 64,000 bits per second (bps) in each direction. In addition, each node may be allocated the same amount of bandwidth. Alternatively, the network manager can allow the node to use the entire bandwidth of the data ring when the token is at that particular node. However, as those skilled in the art can appreciate, in this situation one node could potentially monopolize the entire bandwidth. If only allocated a portion of the bandwidth, a node could simultaneously communicate while other nodes are also communicating.

The invention is not so limited as to encompass only a token-ring protocol of communication, however. Other and further protocols can be used without departing from the scope of the invention. For example, in one embodiment of the invention, there can be two tokens passing around data ring 124 shown in FIG. 10, in opposite directions to one another, because the network is bi-directional. In this situation, a node has permission to communicate with other nodes in the network when either token is at that node. In still a further embodiment of the present invention, there is a protocol facilitating simultaneous communication among the nodes without interference. For example, if there are four nodes in a network according to the present invention, the invention allows two of the nodes to communicate with one another while the other two nodes also communicate with one another, without any interference. As those skilled in the art understand, this is possible because of the bi-directional nature of the invention when used with a bi-directional existing communications system such as ISDN.

Using ISDN is one way to establish a network over an existing communications system according to the present invention, as those skilled in the art will readily appreciate. A specific ISDN line known as a Basic Rate Interface line typically comprises two B channels and a D channel. Thus, the B channels correspond to the data channels coupling nodes to other nodes, and the D channel corresponds to the control channel coupling a node to the switch. Preferably, each B channel has a data rate of 64,000 bits per second (bps), while the D channel has a data rate of 16,000 bits per second (bps). Therefore, each corresponding data channel also has a rate of 64,000 bits per second (bps), while the corresponding control channel has a rate of 16,000 bits per second (bps).

As those skilled in the art understand, each channel of an ISDN line is bi-directional. Therefore, each B channel has a data rate of 64,000 bits per second (bps) in each direction, and the D channel has a data rate of 16,000 bits per second (bps) in each direction. As those skilled in the art also understand, an ISDN line can be executed in a number of different ways, for example, what is know as a twisted pair. Furthermore, the data rate of the individual channels is not always 64,000 or 16,000 bits per second (bps). In a scheme of ISDN primarily used by Pac Bell, each B channel has a data rate of 56,000 bits per second (bps), instead of 64,000 bits per second (bps). The scope of the invention is not so limited to any particular data rate or data rates for the channels of an ISDN line used by the invention.

Those of ordinary skill in the art will readily appreciate that many changes and modifications to the above drawings and description can be made without departure from the spirit or scope of the following claims. For example, the invention as described has been shown to utilize ISDN as the existing communications system, whereas the invention could utilize any existing communications system having two data channels and a control channel without departing from the scope of the following claims. For another example, the invention as described has been shown to utilize a token protocol as the protocol by which nodes on the network communicate to one another, whereas the invention could utilize any protocol without departing from the scope of the following claims.

We claim:

1. A ring-ordered dynamically reconfigurable computer network utilizing an existing communications system having a switch, comprising:

a plurality of nodes, each node coupled to the existing communications system by two data channels which are capable of exclusively communicating all network data, and a control channel, each data channel of each node operably connected to a data channel of another node such that the plurality of nodes is ordered in a ring, the control channel of each node operably connected to the switch; and, a network manager for establishing the network, facilitating communication among the plurality of nodes, and dynamically reconfiguring the network without disturbing communication among the plurality of nodes.

2. The network of claim 1, wherein each node remains on the network only if the node needs to communicate with another node.

3. The network of claim 1, wherein the network manager in establishing the network omits a node if the node refuses to join the network.

4. The network of claim 1, wherein the network manager transmits to each node on the network a confirmation message that the network has been established.

5. The network of claim 1, wherein the network manager includes a joinder module to add to the network a new node coupled to the existing communications system by two data channels and a control channel, the joinder module comprising:

means to operably connect the control channel of the new node to the switch;

means to operably disconnect a data channel of a first node on the network from the data channel of a second node on the network to which the data channel of the first node is operably connected; and, means to operably connect one data channel of the new node to the data channel of the first node and the other data channel of the new node to the data channel of the second node.

6. The network of claim 5, wherein the network manager transmits to each node on the network a confirmation message that the new node has joined the network.

7. The network of claim 1, wherein the network manager includes a removal module for removing from the network a first node, the removal module comprising:

means to operably disconnect a data channel of the first node from the data channel of a second node on the network to which the data channel of the first node is operably connected;

means to operably disconnect the other data channel of the first node from the data channel of a third node on the network to which the other data channel of the first node is operably connected;

means to operably disconnect the control channel of the first node from the switch; and, means to operably connect the data channel of the second node to the data channel of the third node.

8. The network of claim 7, wherein the network manager transmits to each node still on the network a confirmation message that the first node has been removed.

9. The network of claim 1, wherein the network manager passes a token around each of two counter-rotating logical data rings of the network, such that a node on the network communicates with the other nodes only when either token is at the node.

10. The network of claim 9, wherein the tokens travel in directions opposite to one another.

11. The network of claim 9, wherein each node is limited to communicating information over only a portion of a bandwidth of the data rings, such that multiple nodes can simultaneously communicate without any one node monopolizing the entire bandwidth of the data rings.

12. The network of claim 11, wherein each node is limited to an equal portion of the bandwidth.

13. The network of claim 1, wherein the network manager allows a first node to communicate with a second node without disturbing a third node already communicating with a fourth node.

14. The network of claim 1, wherein an ISDN line comprises the data channels and the control channel coupling each node to the existing communications system.

15. The network of claim 14, wherein each ISDN line is a Basic Rate Interface (BRI) line.

16. The network of claim 15, wherein each ISDN line comprises two B channels and a D channel, each data channel corresponding to a B channel and the control channel corresponding to the D channel.

17. The network of claim 16, wherein each data channel has a data rate of 64,000 bits per second and the control channel has a data rate of 16,000 bits per second.

18. The network of claim 16, wherein each data channel has a data rate of 56,000 bits per second and the control channel has a data rate of 16,000 bits per second.

19. A node for joining a ring-ordered dynamically reconfigurable computer network of a plurality of nodes utilizing an existing communications system having a switch, the node comprising:

two data connections, each for operably connecting to a data connection of another node on the network through a data channel and the two data connections capable of exclusively communicating all network data;

a control connection for operably connecting to the switch through a control channel; and, a controller for dynamically connecting the node to the network without disturbing communication among the plurality of nodes.

20. The node of claim 19, wherein the node remains on the network only if the node needs to communicate with another node.

21. The node of claim 19, wherein the node communicates with other nodes on the network only when a token passing around either of two logical data rings of the network is at the node.

22. The node of claim 19, wherein the node communicates with a first node without disturbing a second node already communicating with a third node.

23. The node of claim 19, wherein the controller includes a joinder module to add the node to the network, the joinder module comprising:

means to operably connect the control connection of the node to the switch;

means to operably disconnect a data connection of a first node on the network from the data connection of a second node on the network to which the data connection of the first node is operably connected; and, means to operably connect one data connection of the node to the data connection of the first node and the other data connection of the node to the data connection of the second node.

24. The node of claim 19, wherein the controller includes a removal module to remove the node from the network, the removal module comprising:

means to operably disconnect one data connection of the node from the data connection of a first node on the network to which the data connection of the node is operably connected;

means to operably disconnect the other data connection of the node from the data connection of a second node on the network to which the other data connection of the node is operably connected; means to operably disconnect the control connection of the node from the switch to which the control connection of the node is operably connected; and, means to operably connect the data connection of the first node to the data connection of the second node.

25. The node of claim 19, wherein the control connection and the data connections reside on an electronic card.

26. The node of claim 25, wherein the node further comprises a computer system for housing the electronic card and communicating therewith.

27. The node of claim 19, wherein an ISDN port, receptive to an ISDN line, comprises the data connections and the control connection of the node.

28. The node of claim 27, wherein the ISDN port is receptive to a Basic Rate Interface (BRI) ISDN line.

29. The node of claim 27, wherein the ISDN port comprises two B channel connections and a D channel connection, each data connection corresponding to a B channel connection and the control connection corresponding to the D channel connection.

30. The node of claim 29, wherein each data connection is receptive to a data channel having a rate of 64,000 bits per second and the control connection is receptive to a control channel having a data rate of 16,000 bits per second.

31. The node of claim 29, wherein each data connection is receptive to a data channel having a rate of 56,000 bits per second and the control connection is receptive of a control channel having a data rate of 16,000 bits per second.

32. A network adaptor for connecting a node to a ring-ordered dynamically reconfigurable computer network of a plurality of nodes utilizing an existing communications system having a switch, the network adaptor comprising:

an interface for connecting to the node;

two data connections, each for operably connecting to a data connection of a second network adaptor connecting another node to the network through a data channel, and the two data connections capable of exclusively communicating all network data;

a control connection for operably connecting to the switch through a control channel; and, a controller for dynamically connecting the node to the network without disturbing communication among the plurality of nodes.

33. The adaptor of claim 32, wherein the adaptor connects the node to the network only if the node needs to communicate with another node.

34. The adaptor of claim 32, wherein the node communicates with other nodes on the network only when a token passing around either of two logical data rings of the network is at the adaptor.

35. The adaptor of claim 32, wherein the node communicates with a first node without disturbing a second node already communicating with a third node.

36. The adaptor of claim 32, wherein the controller includes a joinder module to add the node to the network, the joinder module comprising:

means to operably connect the control connection of the adaptor to the switch;

means to operably disconnect a data connection of an adaptor coupled to a first node on the network from the data connection of an adaptor coupled to a second node on the network to which the data connection of the adaptor coupled to the first node is operably connected; and, means to operably connect one data connection of the adaptor to the data connection of the adaptor coupled to the first node and the other data connection of the adaptor to the data connection of the adaptor coupled to the second node.

37. The adaptor of claim 32, wherein the controller includes a removal module to remove the node from the network, the removal module comprising:
   means to operably disconnect one data connection of the adaptor from the data connection of an adaptor coupled to a first node on the network to which the data connection of the adaptor is operably connected;
   means to operably disconnect the other data connection of the adaptor from the data connection of an adaptor coupled to a second node on the network to which the other data connection of the adaptor is operably connected;
   means to operably disconnect the control connection of the adaptor from the switch; and,
   means to operably connect the data connection of the adaptor coupled to the first node to the data connection of the adaptor coupled to the second node.

38. The adaptor of claim 32, wherein the interface of the adaptor is an RS-232 interface.

39. The adaptor of claim 32, wherein the interface of the adaptor is a parallel port interface.

40. The adaptor of claim 32, wherein an ISDN port, receptive to an ISDN line, comprises the data connections and the control connection of the adaptor.

41. The adaptor of claim 40, wherein the ISDN connection is receptive to a Basic Rate Interface (BRI) ISDN line.

42. The adaptor of claim 41, wherein the ISDN port comprises two B channel connections and a D channel connection, each data connection corresponding to a B channel connection and the control connection corresponding to the D channel connection.

43. The adaptor of claim 42, wherein each data connection is receptive to a data channel having a rate of 64,000 bits per second and the control connection is receptive to a control channel having a data rate of 16,000 bits per second.

44. The node of claim 42, wherein each data connection is receptive to a data channel having a rate of 56,000 bits per second and the control connection is receptive to a control channel having a data rate of 16,000 bits per second.

45. A method for establishing a network of a plurality of nodes utilizing an existing communications system having a switch in a ring-ordered, dynamically reconfigurable manner, the method comprising the steps of:
   coupling each node to the existing communications system by two data channels and a control channel;
   operably connecting the control channel of each node to the switch;
   operably connecting each of the two data channels of each node to a data channel of another node such that the plurality of nodes is ordered in a ring, the two data channels capable of exclusively communicating all network data;
   facilitating communication among the plurality of nodes; and,
   dynamically reconfiguring the network without disturbing communication among the plurality of nodes.

46. The method of claim 45, wherein each node remains on the network only if the node needs to communicate with another node.

47. The method of claim 45, wherein a node of the plurality of nodes refuses to join the network.

48. A method for adding a new node having a control channel and two data channels to a network of a plurality of nodes utilizing an existing communications system having a switch in a ring-ordered, dynamically reconfigurable manner, wherein the two data channels are capable of exclusively communicating all network data, the method comprising the steps of:
   operably connecting the control channel of the new node to the switch;
   operably disconnecting a data channel of a first node on the network from the data channel of a second node on the network to which the data channel of the first node is operably connected; and,
   operably connecting one data channel of the new node to the data channel of the first node and the other data channel of the new node to the data channel of the second node.

49. A method for removing a node having a control channel and two data channels from a network of a plurality of nodes utilizing an existing communications system having a switch in a ring-ordered, dynamically reconfigurable manner, wherein the two data channels are capable of exclusively communicating all network data; the method comprising the steps of:
   operably disconnecting a data channel of the node from the data channel of a first node on the network to which the data channel of the node is operably connected;
   operably disconnecting the other data channel of the node from the data channel of a second node on the network to which the other data channel of the node is operably connected;
   operably disconnecting the control channel of the node from the switch; and,
   means to operably connect the data channel of the first node to the data channel of the second node.

50. A node for connecting to a ring-ordered network of a plurality of nodes utilizing an existing communications system having a switch, the node comprising:
   a pair of data connections, each for operably connecting to adjacent nodes on the network, the two data connections capable of exclusively communicating all network data;
   a control connection coupled to the switch; and,
   a controller for communicating with the switch via the control connection for initiating and accepting connections to and from the adjacent nodes on the network such that the plurality of nodes is ordered in a ring.

* * * * *